United States Patent [19]

Kim

[11] Patent Number: 5,032,462

[45] Date of Patent: Jul. 16, 1991

[54] ARTICLES COATED WITH VINYL DISPERSION RESINS

[75] Inventor: Jongshun S. Kim, Avon Lake, Ohio

[73] Assignee: The B.F.Goodrich Company, Brecksville, Ohio

[21] Appl. No.: 381,331

[22] Filed: Jul. 18, 1989

[51] Int. Cl.$^5$ ............................ D02C 3/00; C08J 5/09
[52] U.S. Cl. ..................................... 428/501; 524/297; 524/384; 524/523; 524/569; 524/401; 524/522
[58] Field of Search ............... 524/297, 523, 569, 384; 428/501

[56] References Cited

U.S. PATENT DOCUMENTS

| | | | |
|---|---|---|---|
| 4,309,331 | 1/1982 | Graham | 524/561 |
| 4,458,057 | 7/1984 | Basu | 526/88 |
| 4,533,524 | 8/1985 | Burba et al. | 524/297 |
| 4,581,413 | 4/1986 | Kim | 525/221 |

*Primary Examiner*—Joseph L. Schofer
*Assistant Examiner*—Mark Sweet
*Attorney, Agent, or Firm*—Joe A. Powell

[57] ABSTRACT

Coating compositions comprise a thixotropic resin dispersion in which the resin particles are a vinyl polymer, a cross-linked unsaturated carboxylic acid polymer which is neutralized with a salt of a low valence metal, and an adhesion promoter.

17 Claims, No Drawings

ARTICLES COATED WITH VINYL DISPERSION RESINS

BACKGROUND OF THE INVENTION

Vinyl dispersion resins are dispersions of fine particles of vinyl polymers in a liquid medium. Dispersions of the polymer particles in plasticizers are called plastisols, and can exhibit thixotropic flow properties. These properties render the resins useful as coatings. The dispersions are applied to a surface under high shear conditions, such as through a spray-gun, and they remain on the surface once applied. The coated article is then heated to around 300° F. to fuse the resin particles to provide a uniform protective coating. Such coatings are used in the automotive industry to seal joints between two pieces of metal.

To impart thixotropic flow properties to the resin, a cross-linked unsaturated carboxylic acid polymer can be added to an emulsion of the vinyl polymer as is discussed in U.S. Pat. No. 4,581,413. The vinyl polymer emulsion is usually at a high pH due to the presence of surfactants. Adding the polycarboxylic acid to this slurry can destroy the colloidal stability of the suspension. Thus, as is disclosed in the patent, the polycarboxylic acid polymer is usually neutralized with ammonium hydroxide. The mixture of vinyl resin and polycarboxylic acid is then dried to provide a powder which is then dispersed in the desired liquid to provide the vinyl plastisol.

In a coating use, prior to application an adhesion promoter is added to the plastisol. Unfortunately, certain adhesion promoters interact with the polycarboxylic acid or other acid present as a comonomer with the vinyl chloride monomer. This interaction decreases the effectiveness of the adhesion of the coating. Also, such mixtures do not adhere well to surfaces coated with a primer when fused at temperatures below 270° F.

In view of such disadvantages, a thixotropic vinyl resin dispersion which is fusible at temperatures below 270° F. but which can adhere to metal surfaces is desired.

SUMMARY OF THE INVENTION

In one aspect, this invention is a thixotropic dispersion of vinyl resin in a plasticizer. The particles comprise a major amount of a vinyl polymer, a cross-linked unsaturated carboxylic acid polymer in an amount and associated with the vinyl polymer in a manner sufficient to impart thixotropic flow properties to the dispersion, and a salt of a low valence metal in an amount sufficient to neutralize any residual acid functionality in the particles.

In another aspect, this invention is a process for preparing a thixotropic dispersion of vinyl resin. The process comprises dispersing at least one vinyl monomer in a liquid phase in which the monomer and polymer are insoluble, subjecting the dispersion to polymerization conditions to convert the vinyl monomer to a vinyl polymer, adding to the dispersion of the monomer or polymer a salt of a low valence metal to boost the pH of the dispersion, adding a cross-linked unsaturated carboxylic acid polymer, drying the mixture of vinyl polymer particles and cross-linked carboxylic acid polymer; and dispersing the dried mixture in a plasticizer.

In yet another aspect, this invention is a substrate coated with a coating comprising the above-described vinyl resin dispersion which is further comprised of an adhesion promoter.

In still yet another aspect, this invention is a process for coating a substrate comprising adding to the above-described vinyl resin dispersion an adhesion promoter, applying the coating to a substrate and treating the thus coated substrate at temperatures sufficient to fuse the vinyl polymer particles.

The vinyl resin dispersions of this invention are useful as coatings and sealants. They are thixotropic and thus can be applied to a substrate under conditions of high shear. Moreover, they adhere firmly and securely to metal surfaces after fusing at temperatures of less than 270° F.

DETAILED DESCRIPTION OF THE INVENTION

The vinyl resins are readily prepared by polymerizing a vinyl halide monomer, such as vinyl chloride, optionally with other vinyl comonomers containing at least one terminal $>CH_2$ group in an aqueous emulsion polymerization process wherein the monomer is dispersed in a liquid phase with free radical forming catalysts to form a latex. The resultant polymer particles in the latex have particle sizes less than 15 microns, preferably from about 0.1 to 5.0 microns. The polymers have an inherent viscosity (ASTM-D 1243-66) of about 0.7 to about 1.4. The amount of vinyl chloride monomer will range from greater than about 50% to about 100% by weight of the total monomers polymerized.

The copolymerizable vinyl comonomers contain at least one terminal vinyl group, $>CH_2$, more preferably a terminal methylene group ($H_2C=C<$), is employed therewith. Usually, less than about 50% by weight of the copolymerizable vinyl comonomers is present in the vinyl chloride copolymers of this invention. Examples of copolymerizable comonomers include dienes of 4 to 10 carbon atoms, such as 1,3-butadiene, ethylidene norborene, dicyclopentadiene and other cyclic dienes; α-olefins such as ethylene, propylene, isobutylene, butylene and 4-methyl-1-pentene, 1-octene, and the like, preferably containing 1 to 4 carbon atoms; vinyl bromide, vinylidene chloride, vinyl fluoride; vinyl esters such as vinyl acetate, vinyl benzoate, vinyl laurate and vinyl chloroacetate; vinyl aromatics such as styrene, chlorostyrene, α-methyl styrene, vinyl toluene and vinyl naphthalene; alkyl vinyl ethers and ketones such as methyl vinyl ether, isobutyl vinyl ether, N-butyl vinyl ether, chloroethyl vinyl ether, isobutyl vinyl ether, methyl vinyl ketone, ethyl vinyl ketone, and the like; α,β-olefinically unsaturated nitriles such as acrylonitrile, methacrylonitrile, cyanoalkyl acrylates such as α-cyanomethyl acrylate and the α-,β- and gamma-cyanopropyl acrylates; esters of olefinically unsaturated carboxylic acids including α,β-olefinically unsaturated acids wherein the alkyl groups contain from 1 to 20, preferably 1 to 8, carbon atoms, such as alkyl acrylates selected from the group consisting of methyl acrylate, ethyl acrylate, butyl acrylate, isobutyl acrylate, and the like, haloalkyl acrylates such as chloropropyl acrylate; methacrylate esters such as methyl methacrylate, ethyl methacrylate, methyl ethacrylate, 2-ethylhexyl acrylate, dodecyl methacrylate, stearyl methacrylate, cyclohexyl acrylate, phenyl acrylate, glycidyl acrylate, glycidyl methacrylate, ethoxyethyl acrylate, and the like; esters of maleic and fumaric acid such as methyl fumarate, ethyl maleate and the like; bis(β-haloalkyl)alkenyl phosphonates such as bis(β-chloroethyl)vinyl phosphonate; amide monomers derived from an $\alpha,\beta$-olefinically unsaturated carboxylic acid and having the structural formula

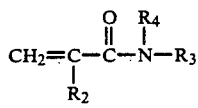

wherein $R_2$ is hydrogen or an alkyl group containing from 1 to 4 carbon atoms and $R_3$ and $R_4$ are hydrogen or a radical containing from 1 to 12 carbon atoms and more preferably an alkyl group containing from 1 to 8 carbon atoms including acrylamide and methacrylamide, N-propyl acrylamide, diacetone acrylamide and the like; $\alpha,\beta$-gamma olefinically unsaturated N-alkylol amides or $\alpha,\beta$-gamma olefinically unsaturated N-alkoxyalkyl amides of the formula

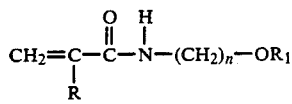

wherein R is hydrogen or an alkyl group containing from 1 to 4 carbon atoms, $R_1$ is hydrogen or an alkyl group containing from 1 to 8 carbon atoms and n is an integer from 1 to 4, including N-methylol acrylamide, N-methylol methacrylamide. Mixtures of any of these types of monomers and other unsaturated polymerizable olefinic monomers copolymerizable therewith; and other polymerizable olefinic monomers of the types known to those skilled in the art.

Preferred comonomers for the dispersion of vinyl resins of this invention are less than 10 weight percent of the copolymer of vinyl acetate, methyl, ethyl, butyl and hexyl acrylates, acrylic acid, maleic acid, fumaric acid, N-methylol or N-propylacrylamide, and the like. Especially preferred is methyl acrylate.

For aqueous emulsion polymerization techniques to provide the desired latices, the aqueous reaction medium can contain one or more emulsifiers, or emulsifier systems such as a salt of a long chain fatty acid and, optionally, a long straight chain saturated alcohol. In this invention, alkali metal or ammonium salts of long chain saturated fatty acids are preferred as the emulsifier or as part of the emulsifier system. Such systems are preferred because a relatively small amount performs as an effective emulsifier. The saturated fatty acids may be either natural or synthetic and should contain from 8 to 20 carbon atoms. Examples of such acids are lauric, myristic, palmitic, stearic, and the like, beef tallow, coconut oil, resin acids, naphthenic acids and the like. Although other known emulsifiers are suitable, the emulsifiers mentioned above are preferred.

The emulsifier is employed usually in an amount in the range of about 0.1% to about 10.0% by weight, preferably to about 4.0%, based on the weight of monomer or monomers being polymerized, and preferably, an amount of emulsifier in the range of about 0.5% to about 3.0% is used. When employing more than one emulsifier in the system, the combined weight thereof will be in the same ranges.

Employing one or more long straight chain alcohols with the emulsifiers named above can provide desirable properties to the vinyl resin dispersion. Examples of such alcohols are octanol, nonanol, decanol, undecanol, dodecanol, tridecanol, tetradecanol, pentadecanol, heptadecanol, octadecanol, nonadecanol, eicosanol, heneicosanol, docosanol, tricosanol, tetracosanol, and the like. Mixtures of alcohols may be used such as a 12 carbon alcohol plus an 18 carbon alcohol, for example dodecanol and octadecanol. Further, ethoxylated alcohols can be used, such as a mixture of ethoxylated linear primary alcohols containing from 12 to 15 carbon atoms, etc. The ratio of alcohol to emulsifier can range from 0.15 to 1.0 or greater depending upon the emulsifier being used. For example, when the emulsifier is an ammonium salt of a fatty acid, the ratio of alcohol to fatty acid salt is greater than 1.0 to 1.0, and preferably is about 1.0 to 4.0.

The polymerization temperature will usually be in the range of about 5° C. to about 100° C., preferably at a temperature in the range of about 40° C. to about 55° C. Polymerizations are normally conducted until greater than 50 weight percent of the monomers are converted into polymers, preferably about 85% or more. The latices normally contain from about 20 to about 55 weight percent total solids.

When the polymerization reaction is complete, the reactor is put under vacuum in order to remove as much of the unreacted monomers as possible and sent to a recovery system. The vinyl polymer latex is normally pumped into a vacuum tank along with steam wherein the monomer, such as vinyl chloride, is flashed off and sent to the recovery system.

In carrying out the polymerization reaction the usual catalysts or initiators which normally form free radicals, including organic peroxides and aliphatic azo compounds may be used. Such materials include for example, $\alpha,\alpha'$-azodiisobutyronitrile and the like; organic peroxides including diacyl peroxides such as acetyl peroxide in dimethyl phthalate, benzoyl peroxide, 2,4-dichlorobenzoyl peroxide, lauroyl peroxide, pelargonyl peroxide; peroxyesters such as esterbutyl peroxyacetate, tert-butyl peroxy(2-ethyl-hexanoate); alkyl peroxides such as $\alpha,\alpha'$-bis-(t-butylperoxy)diisopropylbenzene, n-butyl-4,4-bis(tert-butylperoxy)valerate, di-tert-amyl peroxide, dicumyl peroxide, 2,5-dimethyl-2,5-bis(-tert-butyl hydroperoxide), 1,1,3,3-tetramethyl butyl hydroperoxide, 2,5-dimethylhexane-2,5-dihydroperoxide, diisopropylbenzene hydroperoxide; ketone peroxides; methyl ethyl ketone peroxides, sulfonyl acyl peroxides such as acetyl cyclohexyl sulfonyl peroxide; acetyl sec-heptylsulfonyl peroxide; peroxy carbonates such as tert-butylperoxy isopropyl carbonate; peroxy dicarbonates such as bis(4-t-butylcyclohexyl) peroxy dicarbonate, dicyclohexyl peroxydicarbonate, diisopropyl peroxydicarbonate; di(2-ethyl hexyl)peroxydicarbonate, tertiary alkyl perketals such as 2,2-bis(tert-butylperoxy)butane; bis(4-tert-butyl cyclohexyl)peroxydicarbonate; di-(2 ethyl hexyl)peroxydicarbonate diisononanoyl peroxide, t-butyl hydroperoxide, t-butyl peroxypivalate, cumene hydroperoxide, cyclohexyl hydroperoxide, tert-butyl peroxyneodecanoate, and the like. Useful initiators or catalysts also included are the water-soluble peroxygen compounds, such as hydrogen peroxide, the persulfates, such as potassium persulfate ammonium persulfate, and the like. Also, mixtures of catalysts or initiators may be employed, either water-insoluble or water-soluble or both. Particularly useful initiators are the water-soluble peroxygen compounds, such as hydrogen peroxide, isopropyl peroxydicarbonate, and the like, and the sodium, potassium and ammonium persulfates used by themselves or in an activated redox system. Typical redox systems include alkali metal persulfates in combination with a reducing substance, such as sodium sulfite or sodium bisulfite, a reducing sugar, dimethylamino propionitrile, a diazomercapto compound and a water-soluble ferricyamide compound, or the like. Heavy metal ions may also be used to activate the persulfate catalyzed polymerization. Particularly useful are alkali metal and ammonium persulfate. The amount of initiator used will generally be in the range between about 0.02% and about 1.0% by weight, based on the weight of 100 part of monomer or monomers being polymerized, and preferably an amount between about 0.05% and about 1.0% by weight.

The polymerization reactions are normally conducted by batch charging, but semi-continuous or continuous polymerization reactions may be used. The materials used in the polymerization may be charged to the reactor at one time or part of the materials may be charged initially and the remainder added later. The reaction materials also may be proportioned during the course of the reaction singly or mixed, all of which techniques are well known to those skilled in the art.

The cross-linked, unsaturated carboxylic acid polymers may be obtained in a variety of ways and with a variety of vinyl monomers which contain at least one terminal $>CH_2$ group. Typical cross-linked polymers are, for example, acrylic acid polymers cross-linked with small amounts of polyalkenyl polyethers (U.S. Pat. No. 2,798,053); acrylic acid polymers cross-linked with an oligomer of an allyl-containing ester of acrylic or methacrylic acid (U.S. Pat. No. 4,085,167); maleic anhydride-styrene copolymers cross-linked with divinyl benzene (U.S. Pat. No. 2,533,635); ethylene-maleic anhydride interpolymers cross-linked with triallyl isocyanurate (U.S. Pat. No. 3,951,926); and the like. Other cross-linked carboxylic acid polymers are described in U.S. Pat. Nos. 2,340,110, 2,340,111 and 2,533,635. Particularly useful are those cross-linked, water-swellable copolymers described in U.S. Pat. Nos. 2,798,053, 3,940,351, 4,059,552, 4,062,817 and 4,066,583.

The polymers may be homopolymers or copolymers of an unsaturated, polymerizable carboxylic monomer such as acrylic acid, maleic acid, itaconic acid and the like. Typical useful materials are those described in U.S. Pat. No. 2,798,053. Copolymers for example, include copolymers of acrylic acid with small amounts of polyalkenyl polyether cross-linkers that are gel-like polymers, which absorb large quantities of water or solvents with subsequent substantial increase in volume. Other useful carboxylic acid polymers are described in U.S. Pat. No. 3,940,351, directed to polymers of unsaturated carboxylic acid and at least one acrylic or methacrylic ester where the alkyl group contains 10 to 30 carbon atoms. Other types of such copolymers are described in U.S. Pat. No. 4,062,817. The crosslinked carboxylic acid polymers useful in this invention have molecular weights greater than about 500 and up to several million, usually greater than about 10,000, and preferably greater than about 900,000.

These carboxylic acid polymers are normally prepared in organic media such as hydrocarbons and chlorinated hydrocarbons, for example, benzene, xylene tetraline, hexane, heptane, carbon tetrachloride, methyl chloride, ethyl chloride and the like. Polymerizations are disclosed, for example, in the U.S. Pat. No. 4,062,817 wherein the polymerizations are desirably conducted in the presence of haloethane or halomethane, preferably containing at least 4 halogen atoms, for example, 1,1,2-trichloro-1,2,2-trifluoro-ethane. Other carboxylic acid polymers prepared in similar systems include those described in U.S. Pat. No. 4,066,583. Preferably solvents are used that are solvents for the monomers, but non-solvents for the polymers.

The preferred carboxylic acid monomers useful in the production of the carboxylic acid polymers are the olefinically-unsaturated carboxylic acids containing at least one activated carbon-to-carbon olefinic double bond, and at least one carboxyl group. Especially preferred are acids which contain an olefinic double bond either in the alpha-beta position with respect to a carboxyl group, —C=C—COOH, or as a part of a terminal methylene grouping $CH_2=C>$. Olefinically-unsaturated acids of this class include such materials as the acrylic acids typified by the acrylic acid itself, methacrylic acid, ethacrylic acid, alphachloro-acrylic acid, alpha-cyano acrylic acid, beta methyl-acrylic acid (crotonic acid), alpha-chloro sorbic acid, angelic acid, cinnamic acid, p-chloro cinnamic acid, beta-styryl acrylic acid (1-carboxy-4-phenyl butadiene-1,3), itaconic acid, citraconic acid, mesaconic acid, glutaconic acid, aconitric acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Maleic anhydride and other acid anhydrides useful herein have the general structure

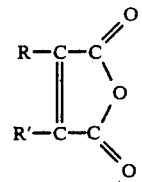

wherein R and R' are selected from the group consisting of hydrogen, halogen and cyanogen (—C≡N) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The most preferred carboxylic acid monomers for use in this invention are the monoolefinic acrylic acids having the general formula

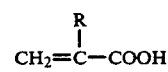

wherein R is a substituent selected from the class consisting of hydrogen, halogen, and the cyanogen (—C≡N) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred because of generally lower cost, ready availability and ability to form superior polymers. Another useful carboxylic monomer is maleic anhydride or the acid.

The polymers contemplated include both cross-linked homopolymeric carboxylic acids or anhydrides thereof, or copolymers of the carboxylic acids and one or more other vinyl monomers containing at least one terminal CH$_2$=CH$_2$< group. Such materials include, for example, acrylic ester monomers including those acrylic ester monomers having long chain aliphatic groups such as derivatives of an acrylic acid represented by the formula

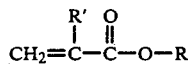

wherein R is an alkyl group having from 10 to 30 carbon atoms, preferably 10 to 20 carbon atoms, and R' is hydrogen or a methyl or ethyl group, present in the copolymer in amount, for example, from about 1 to 30 weight percent, and preferably, about 5 to 15 weight percent. Representative higher alkyl acrylic esters are decyl acrylate, isodecyl methacrylate, lauryl acrylate, stearyl acrylate, behenyl acrylate and melissyl acrylate and the corresponding methacrylates. Mixtures of two or three or more long chain acrylic esters may be successfully polymerized with one of the carboxylic acid monomers. One useful class of copolymers are those methacrylates where the alkyl group contains 16 to 21 carbon atoms. Typical polymers have been made with 15±5 weight percent isodecyl methacrylate, 10±3 weight percent lauryl methacrylate, 7±3 weight percent stearyl methacrylate, with acrylic acid.

Other acrylic esters contemplated are also derivatives of an acrylic acid represented by the formula

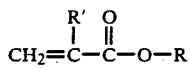

wherein R is an alkyl, alkoxy, haloalkyl, cyanoalkyl, and like groups having from 1 to 9 carbon atoms, and R' is hydrogen or methyl or ethyl group. These acrylic esters are present in the copolymer for some uses in an amount from about 5 to 30 weight percent and more preferably from about 5 to 25 weight percent. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, cyanoethyl acrylate, hydroxyethyl acrylate, chloropropyl acrylate, and the like. Mixtures of these two classes of acrylates provide useful copolymers.

The carboxylic acid polymers are cross-linked with any polyfunctional vinyl monomer and which preferably contain at least 2 terminal CH$_2$< groups, including for example, butadiene, isoprene, divinyl benzene, and divinyl naphthalene. Also preferred are allyl acrylates and the like. Particularly useful cross-linking monomers for use in preparing the copolymers are polyalkenyl polyethers having more than one alkenyl ether grouping per molecule. The most useful possess alkenyl groups in which an olefinic double bond is present attached to a terminal methylene grouping CH$_2$=C<. They are made by the etherification of a polyhydric alcohol containing at least 4 carbon atoms and at least 3 hydroxyl groups. Compounds of this class may be produced by reacting an alkenyl halide, such as allyl chloride or allyl bromide with a strongly alkaline aqueous solution of one or more polyhydric alcohols. The product is a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other cross-linking monomers include, for example diallyl esters, dimethallyl ethers, allyl or methallyl acrylates and acrylamides, tetraallyl tin, tetravinyl silane, polyalkenyl methanes, diacrylates and dimethacrylates, divinyl compounds such as divinyl benzene, polyallyl phosphate, diallyloxy compounds and phosphite esters and the like. Typical agents are allyl pentaerythritol, allyl sucrose, trimethylolpropane triacrylate, 1,6-hexanediol diacrylate, trimethylolpropane diallyl ether, pentaerythritol triacrylate, tetramethylene dimethacrylate, tetramethylene diacrylate, ethylene glycol diacrylate, ethylene dimethacrylate, triethylene glycol dimethacrylate, N,N'-methylene-bis-acrylamide, and the like. Allyl pentaerythritol and allyl sucrose provide excellent polymers in amounts less than 5, and even less than 3.0 weight percent.

Although the carboxylic acid monomeric mixtures usually contain up to about 5 percent by weight of cross-linking monomer based on the total weight of monomers, and more preferably from about 0.1 to about 2.0 weight percent, other crosslinking agents are suitable but less efficient.

These other vinyl comonomers which can be ln used as crosslinking agents include α,β-olefinically unsaturated nitriles, preferably the monoolefinically unsaturated nitriles having from 3 to 10 carbon atoms such as acrylOnitrile, methacrylonitrile, ethacrylonitrile, chloroacrylonitrile, and the like. Most preferred are acrylonitrile and methacrylonitrile. The amounts used are, for example, for some polymers, from about 5 to about 30 weight percent of the total monomers copolymerized. Acrylic amides include monoolefinically unsaturated amides having at least one hydrogen on the amide nitrogen and the olefinic unsaturation is alpha/beta to the carbonyl group. Representative amides include acrylamide, methacrylamide, N-methyl acrylamide, N-t-butyl acrylamide, N-cyclohexyl acrylamide, N-ethyl acrylamide, and others. Preferred are acrylamide and methacrylamide used in amounts, for example, from about 1 to 30 weight percent of the total monomers copolymerized. Other acrylic amides include N-alkylol amides of alpha, beta-olefinically unsaturated carboxylic acids including those having from 4 to 10 carbon atoms such as N-methylol acrylamide, N-ethanol acrylamide, N-propanol acrylamide, N-methylol methacrylamide, N-ethanol acrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type are the N-alkylol amides of alpha, beta-monoolefinically unsaturated monocarboxylic acids and the most preferred are N-methylol acrylamide and N-methylol methacrylamide used in amounts, for example, of about 1 to 20 weight percent. N-alkoxymethyl acrylamides also may be used. It is thus intended that where references are made herein regarding the essential N-substituted alkoxymethyl amides, the term "acrylamide" includes "methacrylamide" within its meaning. The preferred alkoxymethyl acrylamides are those wherein R$_6$ is an alkyl group containing from 2 to 5 carbon atoms and useful is N-butyoxymethyl acrylamide.

Other useful vinyl comonomers useful as cross-linking agents include α-olefins containing from 2 to 12 carbon atoms, more preferably from 2 to 8 carbon atoms; dienes containing from 4 to 10 carbon atoms including butadiene; vinyl esters and allyl esters such as vinyl acetate; vinyl aromatics such as styrene; vinyl and allyl ethers and ketones such as vinyl methyl ether and methyl vinyl ketone; vinyl halides and vinyl chrloride, vinylidene chloride and the like; esters of maleic and fumaric acid and the like.

Polymerization of the monomers to form the water-swellable cross-linked carboxylic acid polymers in a solvent or diluent medium is usually carried out in an aqueous emulsion polymerization process in the presence of a free radical catalyst in a closed vessel in an inert atmosphere under autogenous pressure or artificially induced pressure, or in an open vessel under reflux at atmospheric pressure. Temperature of the polymerization may be varied from about 0° to 100° C. or lower or higher, depending to a degree on the molecular weight desired in the polymer. Polymerization at 25° to 90° C. under autogenous pressure using a free radical catalyst is generally effective in producing polymer yields of 75% to 100%. Typical free radical forming catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, sodium percarbonate, and the like, as well as azo catalysts and azodiisobutyryl nitrile, hereinafter referred to as azoisobutyronitrile. Other catalysts utilizable are the so-called "redox" type of catalyst and the heavy-metal activated catalyst systems. Ultraviolet light may also be used as a source of free radicals. Some systems polymerize solely by heat, but catalysts provide better control. The monomer may be batched charged or continuously added during the course of polymerization or by any other manner of polymerization techniques conventionally used.

The amounts of cross-linked, water-swellable carboxylic acid polymer used to provide thixotropic flow properties will vary from greater than about 0.001 weight part per 100 weight parts of latex total solids to about 1 weight part. Normally the amount used will be from about 0.01 to about 0.5 weight parts. Minimum amounts to provide the desired thixotropic resin dispersion are desired, and excess amounts are not used because of cost and other detrimental reasons.

To obtain the thixotropic resin of this invention, the cross-linked unsaturated carboxylic acid polymer in the form of a latex is added to the vinyl polymer particles. The carboxylic acid polymer can be added to the vinyl polymer particles at any point prior to the drying of the vinyl polymer particles. In this manner, the carboxylic acid polymer can become associated with the vinyl polymer particles in a manner sufficient to provide thixotropic flow properties to a dispersion or plastisol of such particles. Thus, the carboxylic acid polymer latex is preferably added to a latex of the vinyl polymer particles; however, the carboxylic acid polymer latex can also be added to the vinyl polymer particles after the polymerization emulsion medium has been stripped.

Prior to adding the carboxylic acid polymer latex, the salt of the low valence metal is added to the vinyl polymer particles. Depending upon the emulsifier system used during the polymerization of the vinyl polymer and upon the types of comonomers used, the pH of the vinyl polymer latex can be low, such as about 3, or high, such as about 9. For example, if an acrylic acid is used as a comonomer, the pH of the latex will be low. Alternatively, in a system wherein an ester of an olefinically unsaturated carboxylic acid is used as a comonomer, and an alkali metal or ammonium salt of a long chain fatty acid is used as the emulsifier, the pH will be high, for example up around 9. If the pH is low, the amount of the salt of the low valence metal added is an amount sufficient to neutralize an effective amount of any residual acid functionality from the acidic comonomer used, but less than an amount which will destroy the colloidal stability of the particles in the latex. If the pH is high, an amount of the salt of the low valence metal is added sufficient to neutralize an effective amount of any residual acid functionality from the carboxylic acid polymer. In the high pH situation, the salt provides an additional benefit. The vinyl polymer latex is usually stable at pH above about 9. If the pH drops to about 8, the colloidal stability will be destroyed. When the carboxylic acid polymer latex is added, the pH of the vinyl polymer latex is lowered. Thus, adding the salt to the vinyl polymer latex can boost the pH sufficiently such that the subsequent addition of the carboxylic acid polymer does not lower the pH of the system to the point where the colloidal stability is destroyed. Additional salt can be added to the system at any time to maintain the colloidal stability.

The amount of salt used is an amount sufficient to neutralize an effective amount of any residual acid functionality present in the particles. That amount is effective when there is little acid functionality remaining to interfere with the performance of the adhesion promoter. Such amount can vary, but typically it ranges from about 0.001 to about 0.1 phr, parts per hundred resin and preferably from about 0.02 to about 0.05 phr parts per hundred resin. Once the particles are dried, a fine powder resin results having an average particle size of from about 0.1 micron to about 5 microns, and preferably about 0.6 micron.

To form the thixotropic dispersion, the vinyl resin particles are dispersed in a plasticizer. The resultant dispersion is a plastisol. Suitable plasticizers to provide the plastisols are known, and are described in, for example, Sarvetnick, "*Plastisols and Oroanosols,*" published by Van Nostrand-Rheinhold, 1972. Preferred plasticizers are dioctyl phthalate (DOP), diisodecyl phthalate (DIDP), diisononyl phthalate (DINP), and butylbenzyl phthalate (BBP).

While the vinyl resin particles are preferably separated from the water of the latex by spray drying, other methods of isolating and drying the polymer particles are suitable. Other non-spray drying methods are described, for example: in U.S. Pat. No. 4,292,424 the latex is coagulated, the wet cake is rinsed, pressed, broken up, and dried and ground in a fluid energy mill. In each case the crosslinked, water-swellable carboxylic acid polymer should be present in the latex before the polymer particles are isolated and/or dried.

To form a coating composition, the resin is added to a plasticizer to form a plastisol. About 100 parts of resin are added to about 80 parts of plasticizer A filler resin of a compatible polymer type and having a particle size greater than the particle size of the vinyl dispersion resin, but which is not so much greater as to be incompatible with the vinyl dispersion resin can also be included in the coating composition. This filler resin is typically included in an amount ranging from about 0 to about 500, and preferably from about 10 to about 200. Polyvinyl chloride is a useful filler resin. Other compounds which can be employed in the coating composition include inorganic fillers such as chalk (i.e. calcium carbonate) and clay; moisture scavengers, such as calcium oxide and zinc oxide; and a pH adjuster such as dimethyl ethanol amine. An adhesion promoter is added to the composition to assist in the adhesion of the resin to the substrate. As contemplated, the substrate is preferably metal. This metal can be uncoated, but is preferably coated with a layer of primer. An example of a suitable primer is Uniprime ®, which is available from PPG Industries, Inc. An example of suitable adhesion promoters for this invention are polyamino amines types which are available from Sherex Corp. Other known adhesion promoters are suitable, yet the polyamino amine-type are preferred.

The coating composition comprising the vinyl dispersion resin, plasticizer, fillers and adhesion promoter is applied to the desired substrate in any conventional manner. Given the thixotropic nature of the composition, the choice of the particular means is flexible. Such means can range from low shear application by brush or other instrument, to a high shear application by spray gun. Once applied, the surface and coating are heated to a temperature sufficient to fuse the resin. Since higher temperatures require the use of more energy, as low a temperature as is necessary to fuse the resin while also achieving adherence of the resin to the substrate is desired. In this invention, temperatures of less than 270° F. have been found to be sufficient. Preferred temperatures are between 240° F. and 250° F. Typically, thirty minutes is a sufficient time of exposure to the fusing temperature.

At a plasticizer level of about 80 parts per hundred resin, the coating composition can have a Brookfield viscosity measured initially at 2 rpms of from about 200 poise to about 10,000 poise, and at 20 rpm of from about 100 to about 5,000.

The following example illustrates, but does not limit, the invention.

EXAMPLE

A vinyl chloride and methyl acrylate copolymer is prepared by emulsion polymerization. The methyl acrylate is employed at 4% by weight of monomers. The final pH of the latex is about 9.0.

To this copolymer latex, about 0.25 phr of sodium hydroxide is added, followed by the addition of a 0.15 phr of a polycarboxylic acid crosslinked with 0.25 weight percent of allyl pentaerythritol. The crosslinked polycarboxylic acid has a molecular weight of about one million. The resultant mixture is spray-dried to provide a powder resin having an average particle size of 0.6 microns.

This resin is used to make a coating composition with the following formulation (all amounts are in parts per hundred resin):

| | |
|---|---|
| Resin | 70 |
| Polyvinyl chloride homopolymer (40–70 microns) | 30 |
| Calcium carbonate | 100 |
| Calcium oxide | 3 |
| Zinc oxide | 3 |
| Dioctyl Phthalate | 80 |
| Dimethyl Ethanol Amine | 0.1 |

-continued

| | |
|---|---|
| Polyamino Amine (Euretic 580) | 5 |

This coating formulation has an initial Brookfield viscosity at 2 rpms of 1780 poise, and a viscosity at 20 rpms of 554 poise indicating suitable thixotropy. After 24 hours, the viscosity at 2 rpms is 1880 poise and at 20 rpms is 666 poise. The formulation is applied through a spray gun to a steel substrate coated with Uniprime ® (a prime commercially available from PPG Industries). One sample is heated at 250° F. for 30 minutes, while a second sample is heated at 240° F. for 30 minutes. In both samples, the coating adhered to the surface. The coating can only be removed by intense chipping, and in one sample the primer is removed along with a portion of the primer coating.

As a comparison to show the effectiveness of using sodium hydroxide, the above-identified process is followed, except that ammonium hydroxide is used as the neutralizing agent for the polycarboxylic acid. This formulation has an initial Brookfield viscosity of 1680 poise at 2 rpms and 510 poise at 20 rpms. After 24 hours, this formulation has a viscosity of 1860 poise at 2 rpms and 814 poise at 20 rpms. Thus, the composition is adequately thixotropic.

This formulation is applied onto a steel substrate coated with Uniprime ®. One sample is heated at 250° F. for 30 minutes, and another is heated at 240° F. for 30 minutes. In both samples, the coating does not adhere to the substrate. It can be peeled off the substrate easily by hand.

What is claimed is:

1. A metallic substrate coated with a coating composition comprising a thixotropic dispersion of vinyl resin particles dispersed in dioctyl phthalate wherein said particles comprise a major amount of a copolymer of vinyl chloride and an alkyl acrylate comonomer wherein the alkyl group contains from 1 to 8 carbon atoms, a cross-linked unsaturated carboxylic acid polymer in an amount and associated with the vinyl polymer in a manner sufficient to provide thixotropic flow properties to the dispersion, an amount of sodium hydroxide or potassium hydroxide sufficient to neutralize any residual acid functionality in the particles, and a polyamino amine type adhesion promoter.

2. The substrate of claim 1, wherein the substrate and coating composition are subjected to a temperature and for a time sufficient to fuse the resin.

3. The substrate of claim 2, wherein the temperature is less than about 270° F., and the time is about 30 minutes.

4. The substrate of claim 3, wherein the temperature is about 250° F.

5. The substrate of claim 4, wherein the temperature is about 240° F.

6. A metallic substrate coated with a coating composition comprising a thixotropic dispersion of vinyl resin particles dispersed in a plasticizer wherein said particles comprise a major amount of a vinyl polymer, a cross-linked unsaturated carboxylic acid polymer in an amount and associated with the vinyl polymer in a manner sufficient to provide thixotropic flow properties to the dispersion, a salt of a low-valence metal in an amount sufficient to neutralize any residual acid funtionality in the particles, and an adhesion promoter.

7. The substrate of claim 6 wherein the vinyl polymer particles are comprised of a copolymer of a vinyl or vinylidene halide and an olefinically unsaturated comonomer.

8. The substrate of claim 7 wherein the vinyl halide is vinyl chloride and the comonomer is an alkyl acrylate wherein the alkyl group contains from 1 to 8 carbon atoms.

9. The substrate of claim 8 wherein the alkyl acrylate is methyl acrylate.

10. The substrate of claim 8 wherein the low valence salt is an alkali metal or alkaline earth metal salt.

11. The substrate of claim 10 wherein the salt is sodium hydroxide or potassium hydroxide.

12. The substrate of claim 11 wherein the plasticizer is dioctyl phthalate.

13. The substrate of claim 12 wherein the adhesion promoter is a polyamino amine type.

14. The substrate of claim 13 wherein the substrate and coating composition are subjected to a temperature and for a time sufficient to fuse the resin.

15. The substrate of claim 14 wherein the temperature is less than about 270° F., and the time is about 30 minutes.

16. The substrate of claim 15 wherein the temperature is about 250° F.

17. The substrate of claim 16 wherein the temperature is about 240° F.

* * * * *